US005961567A

United States Patent [19]

Azzaro et al.

[11] Patent Number: 5,961,567

[45] Date of Patent: *Oct. 5, 1999

[54] METHOD AND APPARATUS FOR PERFORMANCE BASED ASSESSMENT OF LOCOMOTIVE DIESEL ENGINES

[75] Inventors: Steven Hector Azzaro, Schenectady; Warren Frank Bessler; Christopher Edward Wolfe, both of Niskayuna, all of N.Y.

[73] Assignee: General Electric Company, Schenectady, N.Y.

[ * ] Notice: This patent is subject to a terminal disclaimer.

[21] Appl. No.: 09/145,077

[22] Filed: Sep. 1, 1998

Related U.S. Application Data

[63] Continuation of application No. 08/566,745, Dec. 4, 1995, Pat. No. 5,806,011.

[51] Int. Cl.[6] .................. G06F 17/40; F01P 7/12

[52] U.S. Cl. .................. 701/99; 701/19; 701/34; 318/473; 123/339.24

[58] Field of Search .................. 701/19, 34, 29, 701/30, 99, 10; 318/473; 123/339.24

[56] References Cited

U.S. PATENT DOCUMENTS

| | | | |
|---|---|---|---|
| 4,215,412 | 7/1980 | Bernier et al. | 701/100 |
| 4,912,471 | 3/1990 | Tyburski et al. | 342/42 |
| 5,446,452 | 8/1995 | Litton | 340/870.17 |
| 5,566,092 | 10/1996 | Wang et al. | 364/131 |
| 5,566,745 | 10/1996 | Hill et al. | 165/299 |
| 5,806,011 | 9/1998 | Azzaro et al. | 701/99 |

*Primary Examiner*—Tan Q. Nguyen
*Attorney, Agent, or Firm*—Patrick K. Patnode; Marvin Snyder

[57] ABSTRACT

This invention is directed in general to a locomotive diesel engine, and more specifically, to a method and apparatus for performance based assessment of a locomotive diesel engine.

5 Claims, 4 Drawing Sheets

METHOD AND APPARATUS FOR PERFORMANCE BASED ASSESSMENT OF LOCOMOTIVE DIESEL ENGINES

This application is a continuation of application Ser. No. 08/566,745, filed Dec. 4, 1995, now U.S. Pat. No. 5,806,011 which is hereby incorporated by reference in its entirety.

BACKGROUND OF THE INVENTION

The instant invention is directed in general to locomotive diesel engines, and more specifically, to a method and apparatus for performance based assessment of a locomotive diesel engine.

In diesel locomotive operations, a significant concern is the soundness of a locomotive's engine. Failure of a locomotive's engine could cause serious damage, costly repairs and significant operational delays. Most often, by the time a problem within a locomotive's diesel engine is detected and located, the degradation is too severe to reverse and part replacement, although costly, is the only alternative.

Accordingly, monitoring a diesel engine for indications of degradation is a high priority in diesel locomotive operations. However, monitoring the operation of a locomotive's engine is difficult because of the wide range of operating conditions a locomotive encounters while in use. During a typical operating period, a diesel powered locomotive may travel several thousand miles enduring constant changes in temperature, altitude, load and many other performance variables. With each change in operating conditions, output from a diesel engine changes accordingly. Monitoring the actual performance data from a diesel engine, such as the exhaust temperature or intake air temperature, in order to monitor performance would be an exercise in futility, as the performance data will vary widely as the many changes in ambient temperature, altitude and load take place during operation.

Therefore, it is apparent from the above that there exists a need in the art for an apparatus and method for monitoring a locomotive's diesel engine operating performance which accounts for the many changes in conditions that take place during a typical period of locomotive operation. It is a purpose of this invention, to fulfill this and other needs in the art in a manner more apparent to the skilled artisan once given the following disclosure.

SUMMARY OF THE INVENTION

The above-mentioned needs are met by the instant invention which relates to novel apparatuses and methods for performance based assessment of a locomotive's diesel engine. More particularly, said apparatuses and methods use locomotive operating data to calculate performance parameters and compare actual performance data to the performance parameters for any indication of a significant deviation therefrom.

In a first embodiment, the instant invention comprises a locomotive control system for providing and converting locomotive operating data into predicted performance output and one or more sensors, linked to the locomotive control system, placed within the diesel engine for gathering actual performance data of a locomotive's diesel engine, wherein the locomotive control system compares the predicted performance output to the actual performance data to monitor any substantial deviation therefrom. In an alternative embodiment, the locomotive control system may direct the locomotive operating data to a computer means, wherein the computer means converts the locomotive operating data into predicted performance output and compares the predicted performance output to actual performance data to monitor any substantial deviation therefrom.

The preferred apparatuses and methods for performance based assessment of a locomotive's diesel engine, offer the following advantages: improved recognition of engine part degradation; decreased possibility of engine failure; improved safety; and ease of use. In fact, in many of the preferred embodiments, these factors of improved recognition of engine part degradation, decreased possibility of engine failure, improved safety, and ease of use, are optimized to an extent considerably higher than heretofore achieved in prior, known apparatuses and methods for performance based assessment of a locomotive's diesel engine.

Other objects and advantages of the present invention will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
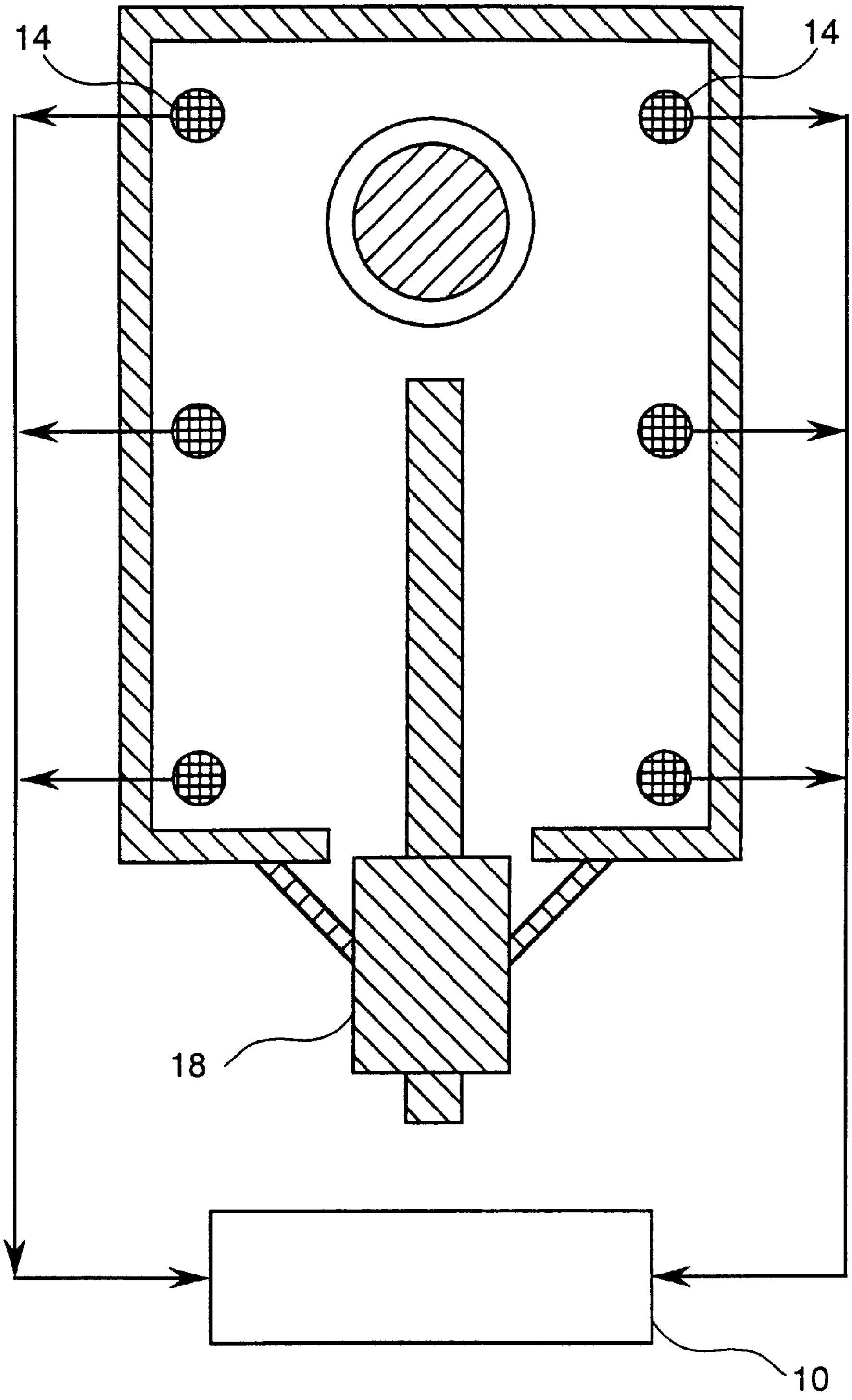
FIG. 1 is an apparatus as disclosed within the instant invention.

Referring first to FIG. 1 of the drawings, a first embodiment of an apparatus for performance based assessment in a locomotive diesel engine is shown.

A first embodiment of the instant invention includes a locomotive control system 10. Locomotive control systems in general are commonly used in locomotive operations and are well known in the art. Locomotive control system 10 provides and converts locomotive operating data into predicted performance output and is linked to one or more sensor(s) 14 placed within the locomotive diesel engine. This predicted performance output indicates performance operating parameters for the diesel engine under the current operating conditions. In an alternative embodiment, the locomotive operating data may be manually introduced into the locomotive control system 10 using an input device.

Sensor(s) 14 can be any of a variety of devices dependent on the particular data being addressed. For instance, the sensor(s) 14 can comprise temperature sensors such as thermocouples or resistance temperature detectors (RTD). The sensor(s) 14 can also include vibration, speed or pressure sensors. Sensor(s) 14 are positioned within a locomotive's diesel engine 18 to sense actual performance data such as exhaust temperatures, inlet air conditions such as temperature, or internal and external pressures.

Locomotive control system 10, monitors the actual performance data detected by the sensor(s) 14. Locomotive control system 10, compares the predicted performance output with the actual performance data to monitor any substantial deviation therefrom.

If the actual performance data detected by sensor(s) 14 does not fall within the range of predicted operating parameters, the locomotive engineer or mechanic is alerted and the diesel engine 18 should be examined, often through the use of a diagnostic system, which determines the problem within the diesel engine 18 causing the deviation from the predicted performance parameters.

Figure 2:
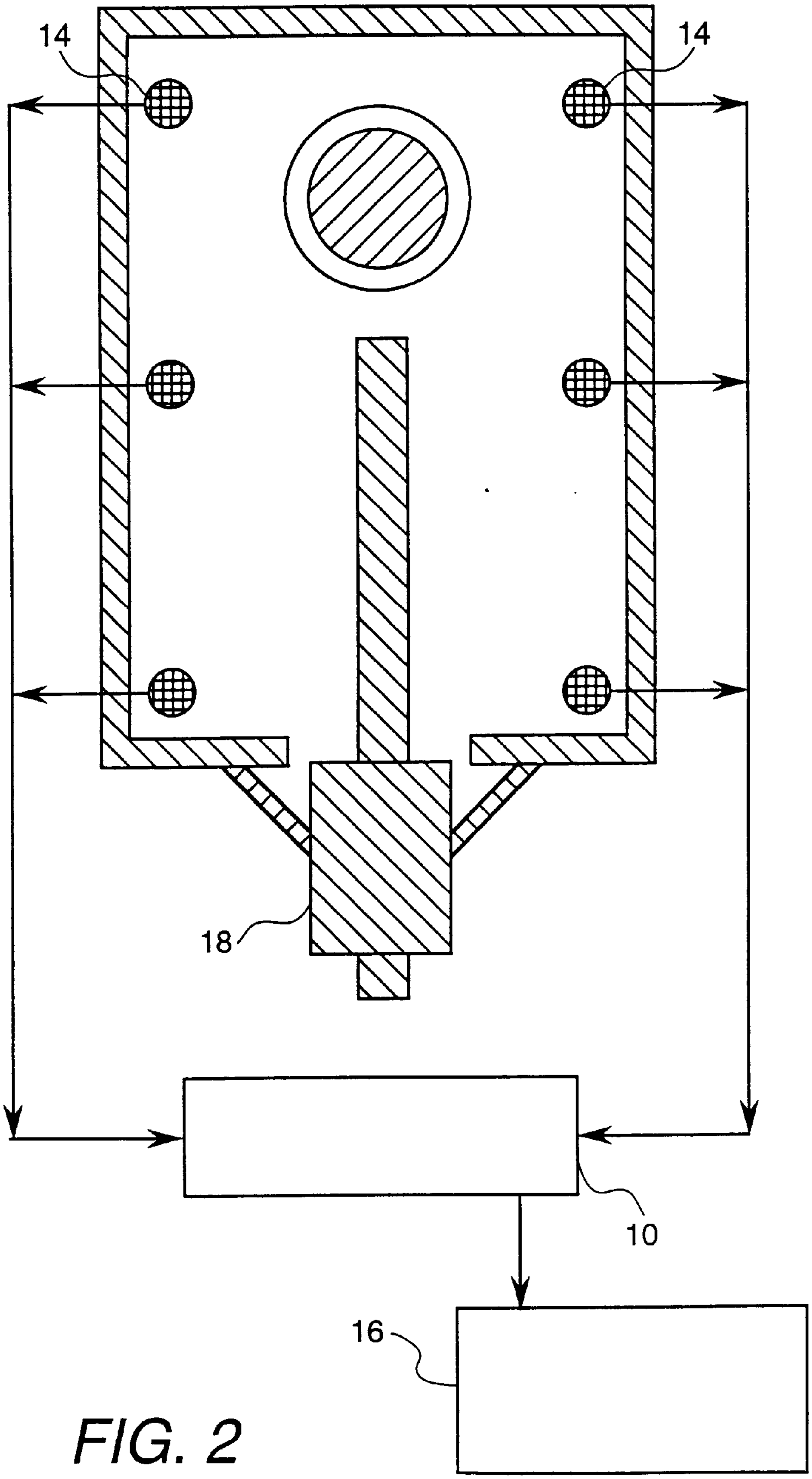
FIG. 2 is an alternative embodiment of the instant invention.

In FIG. 2, wherein identical reference numerals denote the same elements throughout, an alternative embodiment of the instant invention is shown. In said alternative embodiment, said locomotive control system 10 directs said locomotive operating data to a computer means 16, wherein said computer means 16 converts said locomotive operating data into predicted performance output and compares said predicted performance output to said actual performance data to monitor any substantial deviation therefrom.

Figure 3:
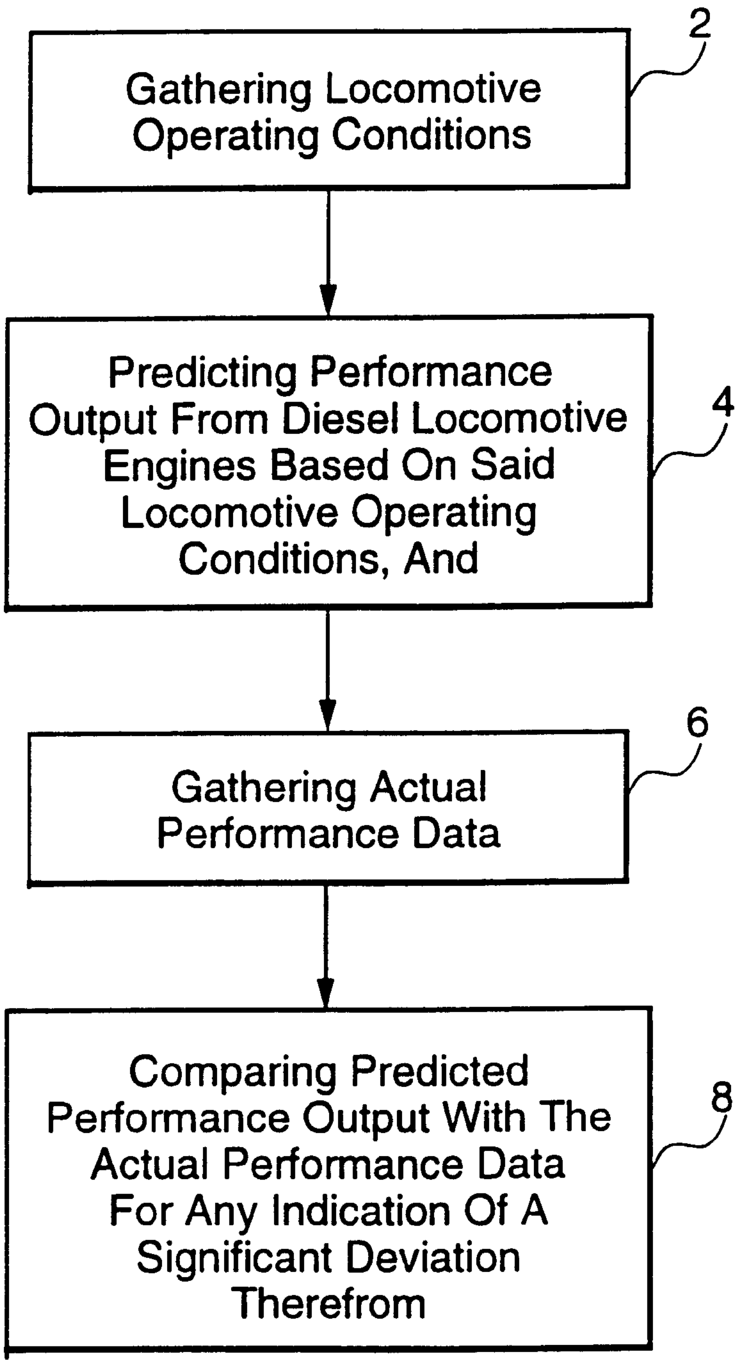
FIG. 3 is a flow chart indicating a series of method steps in accordance with the instant invention.

FIG. 3 depicts a method of performance based assessment of a locomotive's diesel engine, as disclosed within the instant invention. The first step 2 of the instant method is gathering locomotive operating data. The second step 4 of the instant method is predicting performance output from diesel locomotive engines based on the input of said locomotive operating data. The third step 6 of the instant method is gathering actual performance data. The final step 8 of the instant method is comparing the predicted performance output with the actual performance data for any indication of significant deviation therefrom.

Figure 4:
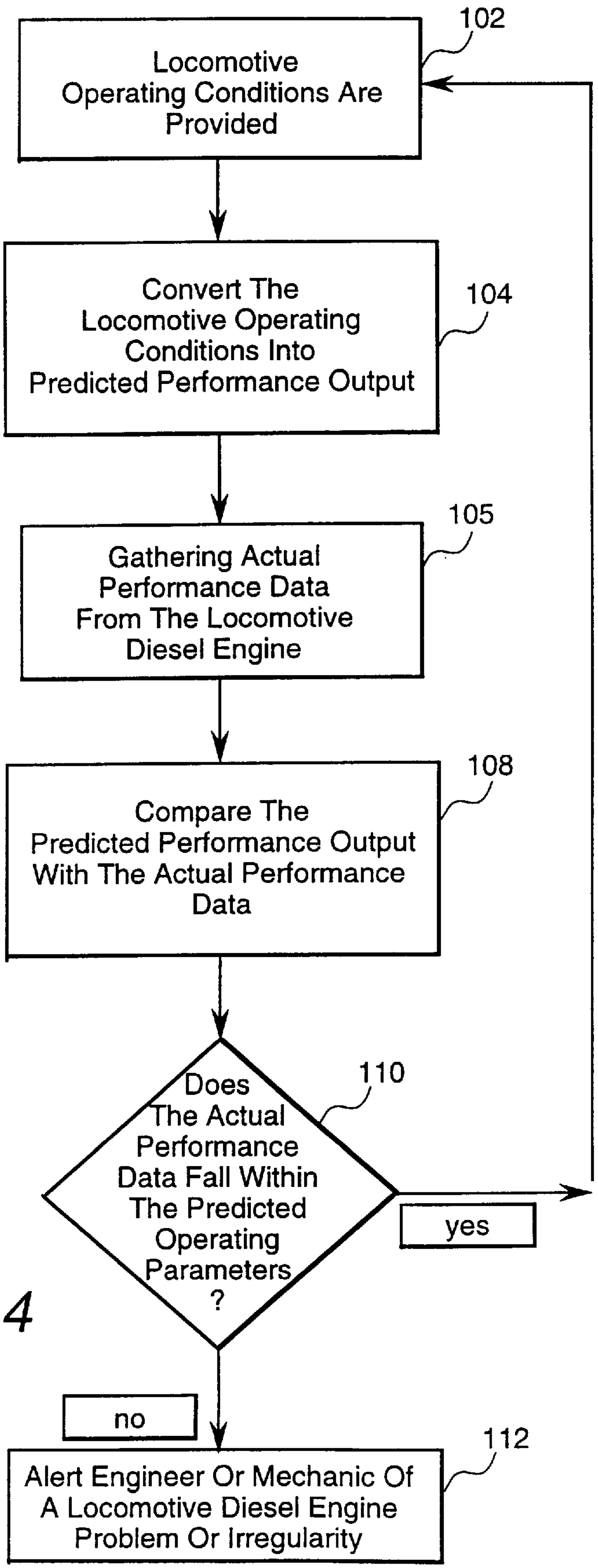
FIG. 4 is a flow chart which illustrates the control method of the instant invention.

Referring now to FIG. 4, the control sequence of the instant invention begins when locomotive operating conditions are provided by locomotive control system 10, as indicated at block 102. Locomotive control system 10 is linked to one or more sensor(s) 14 placed within the locomotive diesel engine. The necessary locomotive operating data, such as, ambient temperature, ambient pressure, altitude, water flow, water temperature, and turbo speed, is provided by the locomotive control system 10. Locomotive control system 10 reads and converts the locomotive operating data into predicted performance output. The predicted performance output indicates the diesel engine's performance operating parameters as shown at block 104. The predicted performance output shows at what levels the locomotive's diesel engine should be operating within, given the known conditions of operation. At block 106, sensor(s) 14, gather actual performance data from the locomotive's diesel engine. The actual performance data shows what levels the locomotive's diesel engine is currently operating at. Locomotive control system 10 monitors sensor(s) 14 and compares the predicted performance output with the actual performance data at block 108. As indicated at block 110, if the actual performance data falls within the predicted operating parameters, the locomotive control system 10 is satisfied that the locomotive's diesel engine is in safe operating condition, and the control sequence is completed and the locomotive control system updates the locomotive operating data (return to block 102).

If the actual performance data does not fall within the predicted operating parameters, the locomotive control system alerts the engineer or mechanic of a locomotive problem or irregularity, and the problem must be determined, as shown at block 112.

The foregoing has described an apparatus and method for performance based assessment of a locomotive diesel engine. While specific embodiments of the instant invention have been described, it will be apparent to those skilled in the art that various modifications thereto can be made without departing from the spirit and scope of the invention as defined in the appended claims.

We claim:

1. A locomotive control system for performance assessment of a locomotive engine, said control system comprising:

a controller;

at least one sensor coupled to said controller, said at least one sensor located proximal to said locomotive engine so as to gather actual performance data from said locomotive engine;

wherein said controller monitors locomotive current operating condition and utilizes the current operating conditions to calculate models of predicted performance output; and wherein said controller compare said models of predicted performance output with said actual performance data to monitor deviations therefrom.

2. A locomotive control system in accordance with claim 1, wherein said at least one sensor comprise temperature sensors.

3. A locomotive control system in accordance with claim 1, wherein said at least one sensor comprises vibration sensors.

4. A locomotive control system in accordance with claim 1, wherein said at least one sensor comprises speed sensors.

5. A locomotive control system in accordance with claim 1, wherein said at least one sensor comprises pressure sensors.

* * * * *